Figure 1:
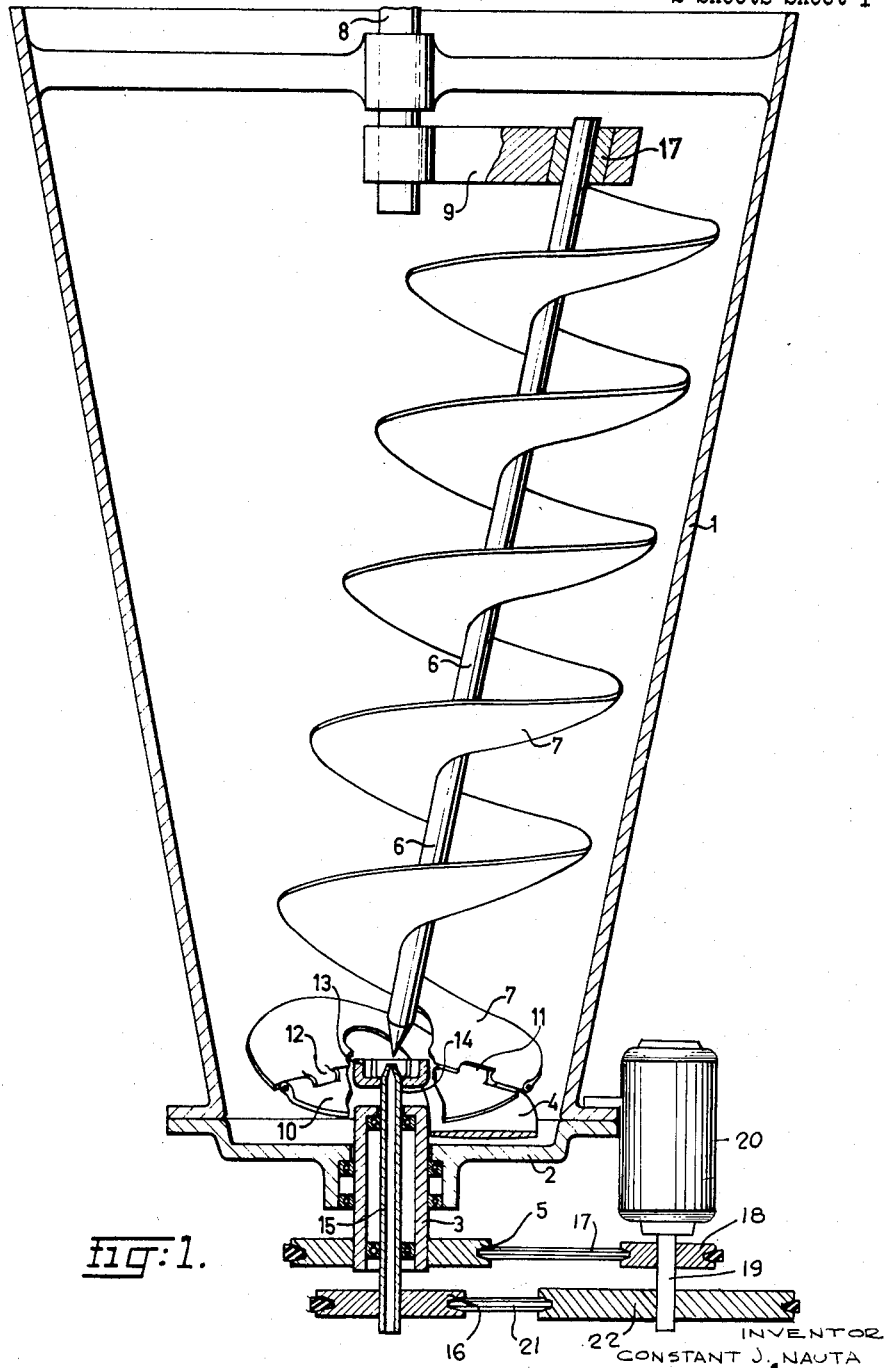

Jan. 10, 1961 C. J. NAUTA 2,967,695
COUPLING JOINT
Filed June 16, 1958 2 Sheets-Sheet 1

INVENTOR
CONSTANT J. NAUTA
BY
ATTORNEY

Jan. 10, 1961

C. J. NAUTA
COUPLING JOINT 2,967,695

Filed June 16, 1958

2 Sheets-Sheet 2

CONSTANT J. NAUTA
*INVENTOR.*

BY

United States Patent Office 2,967,695
Patented Jan. 10, 1961

2,967,695
COUPLING JOINT
Constant J. Nauta, 56 Julianalaan, Overveen, Netherlands
Filed June 16, 1958, Ser. No. 742,185
Claims priority, application Netherlands June 25, 1957
5 Claims. (Cl. 259—102)

This invention generally relates to a coupling joint for rotatably connecting the adjacent end portions of two members having non-aligned, intersecting axes of rotation.

More particularly, this invention relates to conveying and mixing devices of the kind having a frusto-conical mixing vessel with a first conveyor screw extending parallel to the side wall of the conical vessel and being rotated about its own longitudinal axis while it is simultaneously turned about the central axis of the vessel and a second conveyor screw situated at the bottom of the vessel and rotating about the central axis of the latter, and it is an object of the invention to provide such conveying and mixing devices with an improved coupling joint between the first and second conveyor screws thereof, so that the latter can be mutually driven. Previously a Cardan joint has been used for this purpose. However, when the conveyor screws of such a conveying and mixing device are coupled by a Cardan joint, the conveying action in the vicinity of the coupling joint is disturbed for lack of a good passage of the material to be conveyed beyond the coupling joint. This is especially the case when elastic and tenacious substances are to be conveyed and mixed. Although in some cases the inadequate conveying action can be slightly improved by providing the known coupling means with side wings, the mixing disadvantages of the Cardan joint nevertheless prove to be insurmountable and a common difficulty has been experienced in all designs, which badly influenced efficiency so that the requirements for mixing were not sufficiently met.

An important object of the invention is to provide a coupling joint in a conveying and mixing device of the kind referred to above with which the mixing action and conveying action can go on undisturbed from one conveyor screw to the other conveyor screw.

In a preferred embodiment of the invention, the coupling joint cooperates with homogenising means provided in the immediate vicinity of the coupling joint.

In accordance with an aspect of the invention, the two conveyor screws provided in the mixing vessel have axes that intersect at an angle and are rotatably supported in bearings and adapted for the axial conveyance and simultaneous mixing of materials, with at least one of such conveyor screws being provided with means by which it is rotatably driven, and a coupling joint piece substantially consisting of a blade-shaped plate is disposed between and movably coupled with the adjacent end portions of the conveyor screws whereby that coupling joint piece rotatably couples the two conveyor screws and forms a continuous surface of conveyance between the adjacent end portions so that the materials to be handled thereby are subjected to an uninterrupted forward movement in the axial direction from one conveyor screw by way of the coupling piece to the other conveyor screw.

Figure 2:
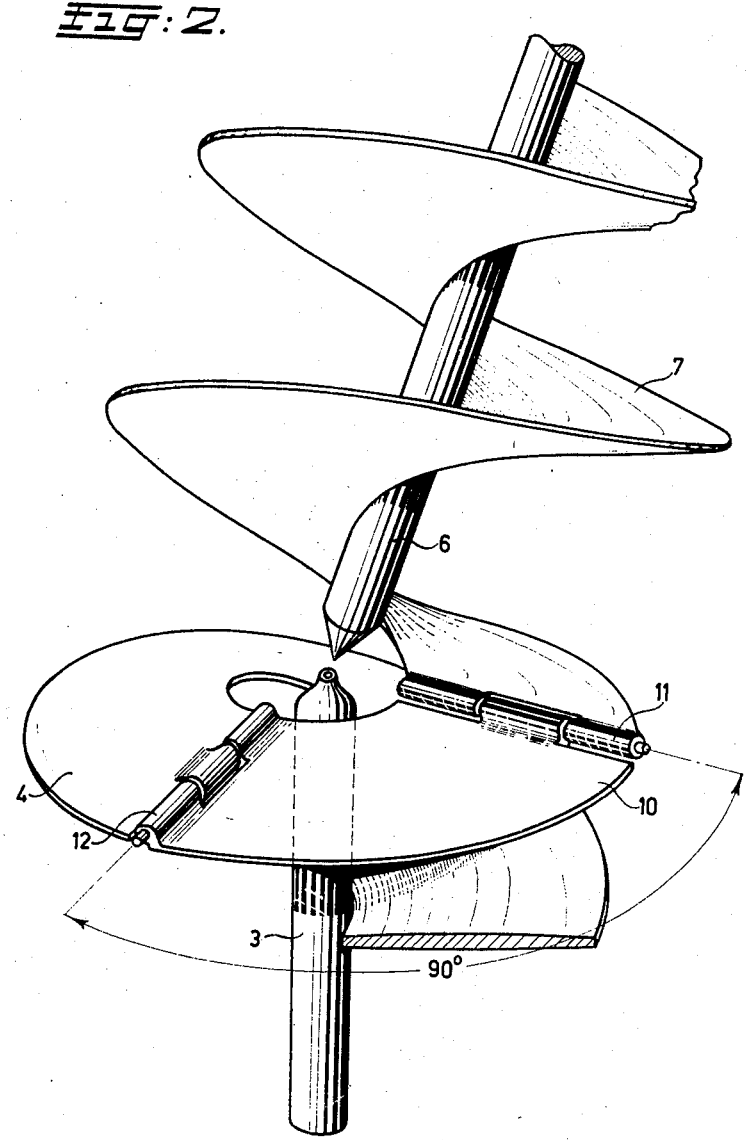

Other objects and advantages of the invention will be apparent from the following detailed description of a preferred embodiment thereof, which is to be read in connection with the accompanying drawings in which:

Fig. 1 is a vertical sectional view of a conical mixing vessel provided with two conveyor and mixing screws, which are rotatably connected by means of a coupling according to the invention; and Fig. 2 is an enlarged perspective view of the coupling joint between the conveyor and mixing screws of Fig. 1.

Referring to the drawings in detail, and initially to Fig. 1 thereof, it will be seen that, in a mixing device embodying the invention, a mixing vessel 1 has a frusto-conical side wall tapering toward the bottom and a shaft 3 rotatably supported in bearings arranged in the bottom 2 of the vessel. The upper end portion of shaft 3 inside of the mixing vessel 1 carries a conveyor and mixing screw 4, while the other end of shaft 3 outside of the mixing vessel carries a pulley 5 by which shaft 3 can be rotated, for example, by a belt 17 running around pulley 5 and a pulley 18 fixed to the shaft 19 of a suitably mounted electric motor 20. A second shaft 6 is arranged parallel to the frusto-conical side wall of the mixing vessel and a conveyor and mixing screw 7 is carried by shaft 6.

In the central upper portion of the mixing vessel a driving shaft 8 is supported in bearings coaxial with the vertical axis of vessel 1, and carries a radial crank arm 9 in which the upper end of shaft 6 is rotatably supported so that shaft 6 can rotate about its own axis and also turn about the central, vertical axis of vessel 1. The lower end of the conveyor mixing screw 4 preferably acts as a scraper blade and is therefore disposed close to the bottom 2 of the vessel.

If desired, the shaft 3 may be driven from the shaft 6, for instance, by directly driving the upper end of the shaft 6 by an electric motor secured to the crank arm 9.

The coupling between the conveyor and mixing screws 4 and 7 includes a blade shaped rigid joint piece 10, which is hingedly connected, at its opposite ends, to the adjacent ends of the conveyor and mixing screws 4 and 7 by hinged means 12 and 11, respectively. Such hinged means may be incorporated in so called silent blocs to ensure smooth running. If the blade of the conveyor and mixing screw 4 in the lowest part of the vessel is of very small height, this mixing screw blade may then be completely eliminated and the hinge 12 may be disposed perpendicularly with respect to the shaft 3 and close to the bottom of the vessel, so that it may serve at the same time as a scraper blade.

Referring to the enlarged view of Fig. 2, it will be seen that extensions of the axes of the hinged means 11 and 12 intersect at the point of intersection of the axes of both shafts 3 and 6 and enclose an angle of 90°.

Although in Fig. 2 a normal hinged construction is represented between rigid joint piece 10 and the blades of screws 4 and 7 it is clearly obvious that any articulated or flexible connection between the rigid joint piece 10 and the respective blades of screws 4 and 7 may be employed and that, if a flexible coupling joint piece is employed in place of the rigid piece 10, riveted connections can be provided between the flexible joint piece and the screw blades.

During the rotation of the shaft 3 and the consequent rotation of the shaft 6 about its longitudinal axis and around the axis of the mixing vessel 1 by reason of the turning of shaft 8, the screw blade shaped joint piece 10 performs a turning and slightly oscillating movement and consequently carries the material to be mixed and transported either upwardly or downwardly depending upon the direction of the pitch of the screw blades.

The coupling according to the invention furthermore offers a solution to the problem concerning the arrangement of homogenising means in the vessel. Heretofore, combined mixing and conveying devices of the described character had the homogenising means disposed in the side wall of the vessel. This location of the homogenising means required the mixing screw to remain at a rather considerable distance from the wall of the vessel and thereby badly affected the mixing efficiency.

In the combined conveying and mixing device embodying the invention as described above, a cup-shaped homogenising member 13 having projections thereon is disposed at the upper extremity 14 of a hollow supply shaft 15 which is rotatably supported in bearings within the hollow shaft 3. The extremity 14 is shown formed as a spray head or nozzle, but other embodiments of the homogenising means are possible, and the other or lower extremity of the hollow shaft 15 carries a pulley 16 by which shaft 15 can be rotated, for example, by a belt 21 running around pulley 16 and around a pulley 22 fixed to motor shaft 19 (Fig. 1).

During operation, the shaft 3 is made to rotate at a rather moderate speed of rotation, while the hollow shaft 15 is made to rotate at a considerably higher rotational speed, for example, by providing the pulleys 5 and 16 with diameters that are respectively larger and smaller than the diameters of the related pulleys 18 and 21, as shown in Fig. 1, or, alternatively, by driving shaft 15 from a motor having a very substantially higher speed than the motor driving shaft 3. As a result of the special positioning of the coupling joint piece 10 which is outside of the bounds of the homogenising means 13 the latter can rotate within the space which is not traversed by the joint piece during its turning and oscillating movement.

Consequently the arrangement embodying the invention provides an extraordinarily favorable mixing and conveying of the material and at the same time homogenises liquid or other substances which are injected into the contents of vessel 1 through the hollow feeding shaft 15. It is to be noted that the shaft 6 can be supported in the crank arm 9 by means of a slide bearing 17 and that stops or the like for arresting axial movement of shaft 6 are not required.

In some cases it may be desirable to provide additional mixing screws at the outer peripheries of the blades of mixing screws 4 and 7, with the direction of movement by the additional mixing screws being contrary to the direction of movement of the related inner screws, and with the additional mixing screws being rotatably coupled in the same way as the blades of screws 4 and 7.

Since the coupling between the screw blades is very easily assembled and disassembled, and consists moreover of a few accessible parts, replacement and cleaning is very simple so that under all circumstances maximum efficiency may be obtained.

Further it may be observed that the coupling joint piece 10 may also be applied between adjacent end portions of conveyor screws constructed from a stiff or rigid helical metal strip or band so as to be self-supporting without the shafts 3 and 6 extending the full length of the mixing and conveying screw blades.

Although a particular embodiment of the invention has been described in detail with reference to the accompanying drawings, it is to be understood that the invention is not limited thereto, and that various changes and modifications may be made in that embodiment without departing from the scope or spirit of the invention, except as defined in the appended claims.

What is claimed is:

1. A mixing device comprising a mixing vessel having a frusto-conical side wall tapering toward the bottom of the vessel, a first mixing screw blade having its longitudinal axis extending parallel to said side wall and mounted for rotation about said longitudinal axis and for turning about the central axis of said vessel, a second mixing screw blade disposed in the bottom portion of said vessel with the longitudinal axis of said second screw blade being coaxial with said central axis of the vessel and intersecting said longitudinal axis of the first screw blade, means for rotating one of said first and second screw blades about its longitudinal axis, and means rotatably coupling together the adjacent ends of said first and second screw blades including a blade-shaped joint piece interposed between said adjacent ends of the screw blades to form an unbroken continuation of the latter and means connecting said joint piece to said adjacent ends of the screw blades for transmitting rotational movement between the latter so that, upon rotation of said one screw blade, the other screw blade is rotated therewith and said screw blades and joint piece cooperate to cause the continuous mixing of the contents of the vessel and the simultaneous movement of the contents along said frusto-conical side wall of the vessel.

2. A mixing device as in claim 1; wherein said first and second screw blades and said blade-shaped joint piece have inner edges of substantial radius of curvature, at least in the vicinity of the intersection of said longitudinal axes of the first and second screw blades, to there define a hollow space; and further comprising a feed-pipe extending upwardly along said longitudinal axis of said second screw blade and opening into said hollow space for supplying an additional substance to be homogenised with the contents of the vessel, homogenising means on the upper end of said feed pipe in said hollow space, and means for rapidly rotating said feed-pipe so that said homogenising means is also rapidly rotated to homogenise the additional substance with the contents of the vessel.

3. A mixing device as in claim 2; further comprising a hollow shaft extending through the bottom of said vessel coaxial with the central axis of the latter and supporting said second screw blade; and wherein said means for rotating one of said screw blades is connected to said hollow shaft, and said feed-pipe extends axially through said hollow shaft and is rotatably journalled in the latter.

4. A mixing device as in claim 1; wherein said means connecting said joint piece to said adjacent ends of the screw blades includes hinge means having pivoting axes which enclose an angle of approximately 90 degrees and the extensions of which intersect at the intersection of said longitudinal axes of the first and second screw blades in order to ensure the smooth transmission of rotational movements between said screw blades.

5. A mixing device as in claim 1; wherein said blade-shaped joint piece is flexible and the opposite end edges thereof enclose an angle of approximately 90 degrees with extensions of said end edges intersecting at the intersection of said longitudinal axes of the first and second screw blades; and wherein said opposite end edges of the joint piece are rigidly secured to said adjacent ends of the screw blades.

References Cited in the file of this patent

UNITED STATES PATENTS

| | | |
|---|---|---|
| 1,703,465 | Woodhead | Feb. 26, 1929 |
| 2,266,650 | Matheis | Dec. 16, 1941 |
| 2,345,063 | Nauta | Mar. 28, 1944 |
| 2,540,975 | Webb | Feb. 6, 1951 |
| 2,686,045 | Byberg | Aug. 10, 1954 |

FOREIGN PATENTS

| | | |
|---|---|---|
| 70,800 | Netherlands | Sept. 15, 1952 |
| 518,209 | Belgium | Mar. 31, 1953 |